June 5, 1928. 1,672,390

V. MONROE

HOOK

Filed April 5, 1926

WITNESSES
J. Herbert Bradley

INVENTOR
Verne Monroe
By Green and McCallister
His Attorneys

Patented June 5, 1928.

1,672,390

UNITED STATES PATENT OFFICE.

VERNE MONROE, OF CAMERON, WEST VIRGINIA.

HOOK.

Application filed April 5, 1926. Serial No. 99,806.

This invention relates to hooks or fasteners and more particularly to that type adapted to be used in connection with the side links of non-skid chains generally employed on motor vehicles.

An object of this invention is to provide a device of the type set forth having an improved construction which can be easily and quickly operated to connect or disconnect the links of a chain.

A further object is to provide a device of the type set forth of such construction and arrangement that it is locked in chain retaining position by tension on the associated chain.

A further object is to provide a fastener for the purpose set forth of simple and rugged construction which will be positive in operation and easy and cheap to manufacture.

Figure 1:
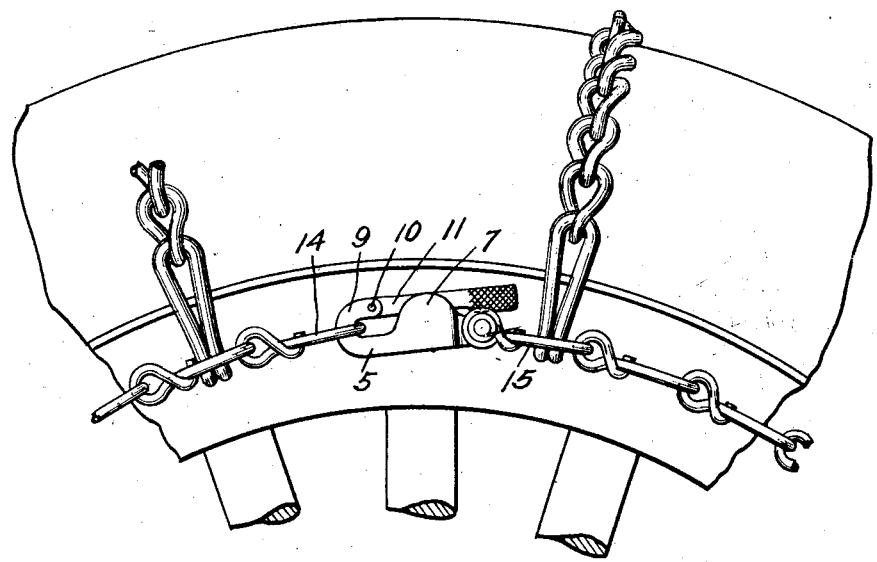
Figure 2:
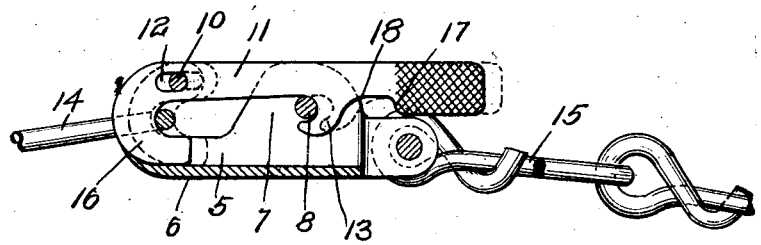
Figure 3:
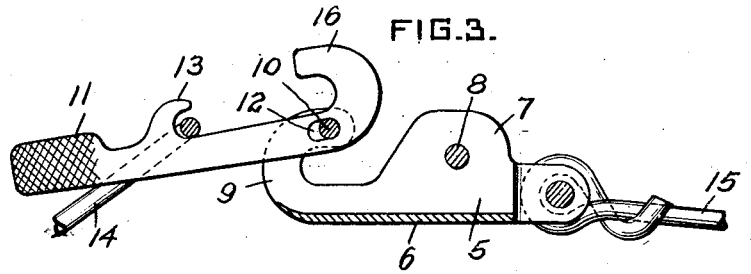

These and other objects which will be apparent to those skilled in this particular art are accomplished by means of this invention, one embodiment of which is illustrated in the accompanying drawings, in which Figure 1 is a view in side elevation of a fastener constructed in accordance with one form of this invention and showing one manner of using the same. Fig. 2 is a central longitudinal section thereof showing the fastener in locked chain retaining position and Fig. 3 is a similar view illustrating the open position.

The particular embodiment of the invention which has been chosen for the purposes of illustration includes a body member having a latch secured thereto and relatively movable thereon to open position to permit the associated chain links to be disconnected, or to closed position for securing the chain links together. The construction is such that when in closed position tension on the chain automatically locks the latch against opening.

As illustrated, the invention includes a body member 5, formed by a base portion 6, provided with two upstanding wings or ears 7 forming a slot therebetween. A pin 8 extends across the space between the wings to which it is permanently secured. Two upstanding fingers 9 are also formed on the body member 5 and extend in the same direction therefrom as the wings 7 and a pivot pin 10 extends across the space between the fingers to which it is secured. A latch lever 11 is loosely pivoted between the fingers 9 preferably by means of a slot 12 formed therein and engaging the pivot pin 10 although, obviously, any other desired form of connection permitting longitudinal movement between the latch lever 11 and the body portion of the fastener could be used.

The latch 11 has a hook 13 or the like formed thereon adapted to be positioned in operative association with the pin 8 so as to lock the latch to the body member as a result of longitudinal movement of the latch relatively to the body member when in closed position and under the tension of the associated chain as illustrated in Fig. 2. The hook 13 is also useful in engaging the loose chain link 14 which is to be connected to the chain link 15 to which the fastener is permanently secured. The latch has a curved finger 16 by means of which the tension on the chain is transmitted to the latch so as to move the same into locked position and the finger also forms an additional lock for the latch when in the position shown in Fig. 2.

If the locking hook 13 were not provided any attempt to open the latch 11 when in the full line position illustrated in Fig. 2 would be prevented as a result of the fact that the distance from the bottom of the curved finger 16 to the pivot 10 is greater than the distance from the pivot 10 to the base portion 6. Obviously drawing the latch to the dotted line position in Fig. 2, when the pin is in the other end of the slot 12, so shortens the distance between the pin and the bottom of the finger 16 as to permit the latch to be rotated to open position. That is to say, when the latch 11 is in the position illustrated in full line in Fig. 2, it cannot be rotated to open position as the outer surface of the curved finger 16 will jamb against the base portion 6 of the body member, whereas, shifting the latch to the right to the position illustrated in dotted lines, moves the curved finger 16 inwardly to such a position that the latch can be moved to open position without causing the finger to encounter the base portion 6.

To separate the chain links it is only necessary to move the latch to the right as illustrated in Fig. 2 so as to free the hook 13 from the locking rod 8 after which the latch can be moved to the open position shown in Fig. 3. In order to provide a means for forcing the latch to the unlocked position in case dirt or other substance causes it to stick the lever is provided with a shoulder 17 which is positioned opposite a cooperating surface 18 formed on the wings 7. By inserting a screw driver or similar tool between the shoulder 17 and the opposed surface 18 the latch can be forced to the right as illustrated in Fig. 2 to unlocked position.

What I claim as new and desire to secure by Letters Patent is:

1. A chain fastener having in combination a body member, a locking rod secured thereto, a latch, a pin and slot connection between said body member and said latch and means on said latch adapted to engage said rod to lock said latch to said body member upon longitudinal movement thereof of said latch relatively to said body member in one direction and to release said latch upon movement thereof in the opposite direction.

2. A chain fastener having in combination a body member, a locking rod secured thereto, a latch, a pin and slot connection between said body member and said latch and means on said latch adapted to engage said rod to lock said latch to said body member upon longitudinal movement of said latch relatively to said body member in one direction and to release said latch upon movement thereof in the opposite direction and means on said latch whereby tension of said chain holds said locking members in engagement.

3. A chain fastener having in combination a body member, a latch pivoted thereto and adapted to be moved longitudinally thereof and means including a hook-shaped projection on said latch for locking said latch to said body member when moved longitudinally thereof in one direction.

4. A chain fastener having in combination a body member and a latch mounted thereon and adapted to be locked in closed position by longitudinal movement thereof relatively to said body member and surfaces on said member and said latch adapted to be engaged by a tool for shifting said latch longitudinally to unlock said member and latch.

5. A chain fastener having in combination a body member and a latch mounted thereon and adapted to be locked thereto by longitudinal movement relatively to said body member, said latch having a shoulder adapted to be engaged by a tool for moving said latch longitudinally to unlocked position.

6. A chain fastener having in combination a body member, a locking rod secured thereto and a latch provided with a rod engaging hook for locking said latch to said body member.

In testimony whereof, I have hereunto subscribed my name this 2nd day of April, 1926.

VERNE MONROE.